United States Patent
Chen et al.

(10) Patent No.: US 11,610,402 B2
(45) Date of Patent: Mar. 21, 2023

(54) SYSTEM AND METHOD FOR CROWDSOURCING A VIDEO SUMMARY FOR CREATING AN ENHANCED VIDEO SUMMARY

(71) Applicant: CLIPr Co., Kirkland, WA (US)

(72) Inventors: Humphrey Chen, Norwood, NJ (US); Cindy Chin, New York, NY (US); Aaron Sloman, Costa Mesa, CA (US)

(73) Assignee: CLIPr Co., Kirkland, WA (US)

( * ) Notice: Subject to any disclaimer, the term of this patent is extended or adjusted under 35 U.S.C. 154(b) by 36 days.

(21) Appl. No.: 17/317,632

(22) Filed: May 11, 2021

(65) Prior Publication Data

US 2022/0366169 A1 Nov. 17, 2022

(51) Int. Cl.
| | | |
|---|---|---|
| *G06V 20/40* | (2022.01) | |
| *G06F 16/70* | (2019.01) | |
| *G06N 20/00* | (2019.01) | |
| *G06N 5/04* | (2023.01) | |
| *G11B 27/036* | (2006.01) | |
| *G06F 18/40* | (2023.01) | |
| *G06F 18/21* | (2023.01) | |

(52) U.S. Cl.
CPC .............. *G06V 20/47* (2022.01); *G06F 16/70* (2019.01); *G06F 18/2178* (2023.01); *G06F 18/41* (2023.01); *G06N 5/04* (2013.01); *G06N 20/00* (2019.01); *G11B 27/036* (2013.01)

(58) Field of Classification Search
CPC ........ G06V 20/47; G06F 16/70; G06N 20/00; G11B 27/036
USPC ......................................................... 386/264
See application file for complete search history.

(56) References Cited

U.S. PATENT DOCUMENTS

| | | | |
|---|---|---|---|
| 5,835,667 A | 11/1998 | Wactlar et al. | |
| 8,873,861 B2 * | 10/2014 | Motoi | H04N 21/8456 382/209 |
| 11,152,031 B1 * | 10/2021 | Chen | G11B 27/06 |

(Continued)

FOREIGN PATENT DOCUMENTS

DE 102006027720 12/2007

OTHER PUBLICATIONS

International Search Report and Written Opinion of the International Searching Authority for PCT/US2021/032168 dated Feb. 10, 2022, 13 pages.

*Primary Examiner* — Helen Shibru
(74) *Attorney, Agent, or Firm* — Lowenstein Sandler LLP (57) ABSTRACT

System and method for crowdsourcing a video summary for creating an enhanced video summary are disclosed. The method includes receiving videos, analysing the videos, creating the video summary of the videos using a building block model, storing the video summary in a video library database, crowdsourcing the video summary to at least one of the plurality of users, enabling the at least one of the plurality of users to review the video summary and identify at least one new characteristic, enabling the at least one of the plurality of users to share the at least one new characteristic on the platform, comparing at least one existing characteristic of the building block model with the corresponding new characteristic, reconciling the video summary along with at least one inserted new characteristic, creating a new building block model, editing the video summary for creating the enhanced video summary.

14 Claims, 5 Drawing Sheets

(56) References Cited

U.S. PATENT DOCUMENTS

| | | |
|---|---|---|
| 11,355,155 B1* | 6/2022 | Chen .................... H04N 21/251 |
| 2002/0093591 A1 | 7/2002 | Yihong et al. |
| 2014/0328570 A1 | 11/2014 | Hui et al. |
| 2017/0124400 A1 | 5/2017 | Rohekar et al. |
| 2018/0176661 A1 | 6/2018 | Varndell et al. |
| 2022/0027634 A1* | 1/2022 | Wang .................... G06V 20/49 |
| 2022/0366283 A1* | 11/2022 | Chen ..................... G06Q 10/10 |

\* cited by examiner

SYSTEM AND METHOD FOR CROWDSOURCING A VIDEO SUMMARY FOR CREATING AN ENHANCED VIDEO SUMMARY

FIELD OF INVENTION

Embodiments of a present disclosure relate to video summary, and more particularly, to a system and method for crowdsourcing a video summary for creating an enhanced video summary.

BACKGROUND

Video summary or a video synopsis is a presentation of events that enables the review of hours of video footage in a pre-defined amount of time. More specifically, video summary can be described as a brief presentation of contents by merging multiple images or videos. In a conventional approach, a user may create the video summary by manually editing the multiple videos and syncing multiple edited video frames to generate the video summary. However, the conventional approach is time consuming as it is done manually and also are prone to miss out the most relevant frames due to human errors. Due to these limitations, the conventional approach is less reliable and less efficient.

In comparison to the conventional approach, a newer approach is used to create the video summary automatically by a computing device. However, the newer approach does not allow any external entity to alter or modify the video summary, or even to provide any suggestions or comments on the created video summary. More specifically, such approaches do not allow any crowdsourcing of the video summary. Since the option of enhancing the created video summary is lacking, the users may lose interest in utilizing such video summary. Also, if any of the content or any moments are being missed by the system, there is no option available to create the video summary by understanding the missing content and enhancing the summary. In such cases, the system does not satisfy the requirements and needs of the user. Further, such limitations make the newer approach less efficient and less reliable.

Hence, there is a need for an improved system and method for crowdsourcing a video summary for creating an enhanced video summary to address the aforementioned issues.

BRIEF DESCRIPTION

In accordance with one embodiment of the disclosure, a system to crowdsource a video summary to create an enhanced video summary is disclosed. The system includes one or more processors. The system also includes a video input module configured to receive one or more videos associated to a plurality of users registered on a platform, from one or more sources. The system also includes a video analysis module configured to analyse the one or more videos based on one or more features using an image processing technique. The system also includes a video summary module configured to create the video summary of the one or more videos using a building block model based on one or more analysed videos using one of an artificial intelligence technique or a machine learning technique, or a combination thereof. The system also includes a video storage module configured to store the video summary in a video library database. The system also includes a video crowdsourcing module configured to crowdsource the video summary to at least one of the plurality of users. The system also includes a video review module configured to enable the at least one of the plurality of users to review the video summary and identify at least one new characteristic associated with the video summary. The system also includes a characteristic input module configured to enable the at least one of the plurality of users to share the at least one new characteristic on the platform. The system also includes a video comparison module configured to compare at least one existing characteristic of the building block model with the corresponding at least one new characteristic shared by the at least one of the plurality of users. The system also includes a video reconciliation module configured to reconcile the video summary along with at least one inserted new characteristic with the building block model to enable the building block model to learn using the machine learning technique. The video reconciliation module is also configured to create a new building block model as and when the building block model learns about the at least one new characteristic. The system also includes a video editing module configured to edit the video summary by inserting the at least one new characteristic into the video summary to create the enhanced video summary.

In accordance with another embodiment of the disclosure, a method for crowdsourcing a video summary for creating an enhanced video summary is disclosed. The method includes receiving one or more videos associated to a plurality of users registered on a platform, from one or more sources. The method also includes analysing the one or more videos based on one or more features using an image processing technique. The method also includes creating the video summary of the one or more videos using a building block model based on one or more analysed videos using one of an artificial intelligence technique or a machine learning technique, or a combination thereof. The method also includes storing the video summary in a video library database. The method also includes crowdsourcing the video summary to at least one of the plurality of users. The method also includes enabling the at least one of the plurality of users to review the video summary and identify at least one new characteristic associated with the video summary. The method also includes enabling the at least one of the plurality of users to share the at least one new characteristic on the platform. The method also includes comparing at least one existing characteristic of the building block model with the corresponding at least one new characteristic. The method also includes reconciling the video summary along with at least one inserted new characteristic with the building block model for enabling the building block model for learning using the machine learning technique. The method also includes creating a new building block model as and when the building block model learns about the at least one new characteristic. The method also includes editing the video summary by inserting the at least one new characteristic into the video summary to create the enhanced video summary.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to crowdsource a video summary to create an enhanced video summary. As used herein, the term 'video summary' may be defined as a presentation of events that enables the review of hours of video footage in a pre-defined amount of time. Also, the term 'crowdsourcing' is defined as a sourcing model in which individuals or organizations obtain goods and services, including ideas, voting, microtasks and finances, from a large, relatively open and often rapidly evolving group of participants.

Figure 1:
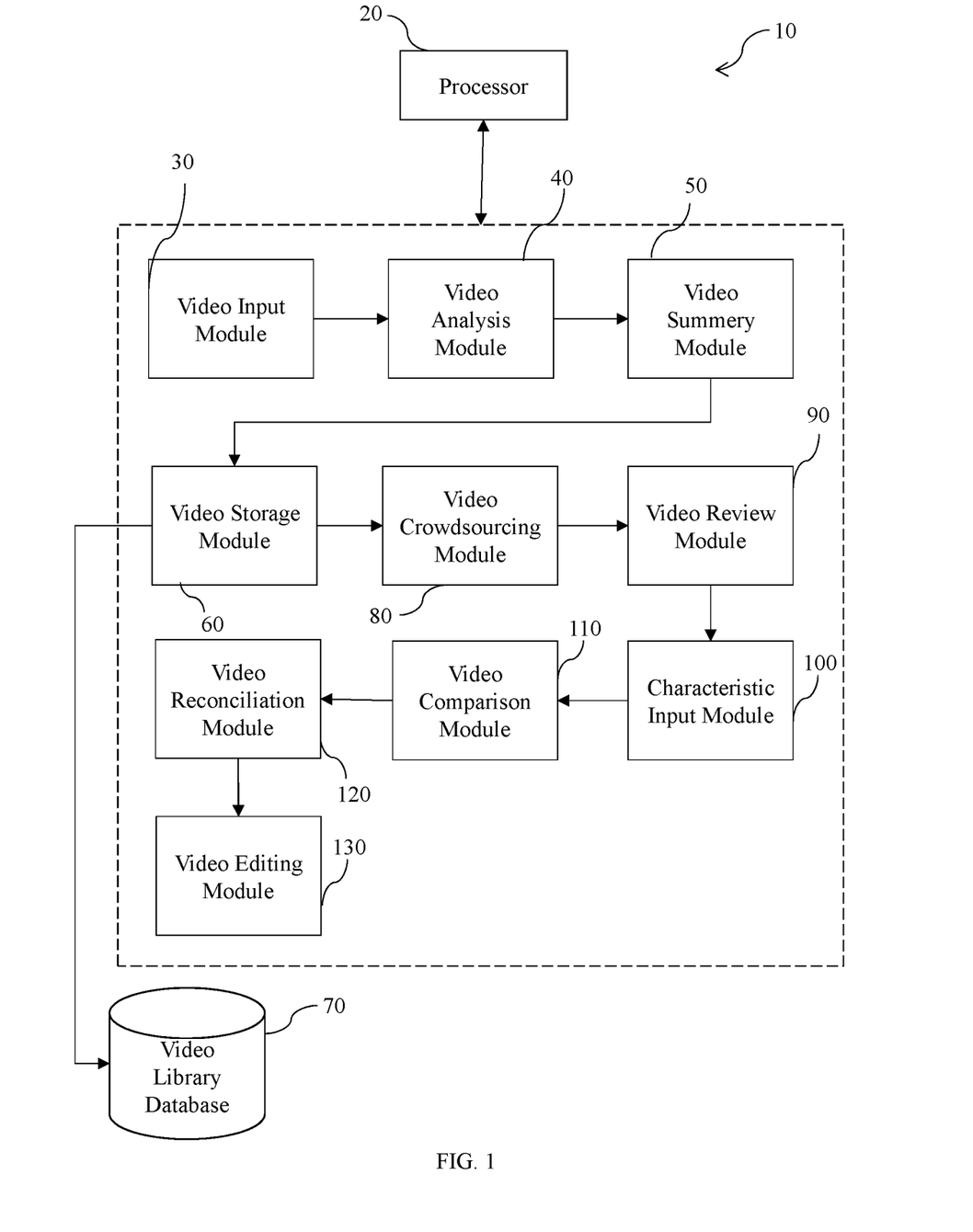
FIG. 1 is a block diagram representation of a system to crowdsource a video summary to create an enhanced video summary in accordance with an embodiment of the present disclosure.

FIG. 1 is a block diagram representation of a system 10 to crowdsource a video summary to create an enhanced video summary in accordance with an embodiment of the present disclosure. The system 10 includes one or more processors 20. The system also includes multiple modules which are operable by the one or more processors 20. One such module is a video input module 30 which is configured to receive one or more videos associated to a plurality of users registered on a platform, from one or more sources. In one specific embodiment, the plurality of users may register on the platform upon providing multiple user details via a registration module. In such embodiment, the multiple user details may include name, age, occupation, employer, contact details/s or the like.

In one embodiment, the one or more videos may be representative of an event which may be associated to the corresponding plurality of users. In one exemplary embodiment, the one or more sources may include at least one of an internal source, an external source or a combination thereof. Here, in one embodiment, the internal source may include a storage unit within the platform. In another embodiment, the internal storage may be a storage unit within a user device through which the corresponding plurality of users may be accessing the platform. In such embodiment, the user device may be a computing device such as a laptop, a tablet, a mobile phone, or the like. Further, in one exemplary embodiment, the one or more external sources may include a storage unit which may not be synced with the platform or with the user device. In such embodiment, the one or more videos may be transmitted to the video input module 30 via a communication medium. In one embodiment, the communication medium may be a wired or a wireless communication medium.

In some embodiment, the one or more videos may be transferred or transmitted to the video input module 30 or may retrieve the one or more videos automatically based on certain pre-defined set of instructions. In one embodiment, the pre-defined set of instructions may include at least one of a date, a day, a place, a type of event, a specific person, a specific group of people, keywords, highlights or the like. In such embodiments, the video input module 30 may use a crawler to crawl the storage unit in order to access the one or more videos upon applying the pre-defined set of instructions on the storage unit. The pre-defined set of instructions may be set by an authorized user or by the corresponding one or more users.

Further, the system 10 includes a video analysis module 40 configured to analyse the one or more videos based on one or more features using an image processing technique. In one embodiment, the one or more features may include at least one of time at which the one or more videos were captured, place in which the one or more videos were captured, event in which the one or more videos were captured, at least one of the plurality of users who have been captured in the one or more videos, content of the one or more videos, one or more similar moments from the corresponding one or more videos, or the like. As used herein, the term "image processing technique" may be referred as a method or a technique to perform some operations on an image or a video, in order to extract some useful information from the one or more videos. In one exemplary embodiment, the one or more features may be defined by one of an authorized person, at least one of the plurality of users or a combination thereof.

Furthermore, the system 10 includes a video summary module 50 configured to create the video summary of the one or more videos using a building block model based on one or more analysed videos using one of an artificial intelligence technique or a machine learning technique, or a combination thereof. As used herein, the term "artificial intelligence (AI)" is defined as an intelligence demonstrated by machines to perform or mimic human intelligence and human behavior. Also, the term "Machine learning (ML)" is defined as a study of computer algorithms that improve automatically through experience upon leaning using a built model which is based on a sample set of data. In one exemplary embodiment, the AI technique may include a natural language processing technique. In one embodiment, the ML technique may include one of a supervised technique. Here, the one or more videos may be divided into multiple video frames and similar frames may be categorized and synced together to create the video summary of a pre-defined time interval.

The system 10 also includes a video storage module 60 configured to store the video summary in a video library database 70. Here, the video summary may be stored in the video library database 70 upon receiving an instruction from the one or more processors 20, wherein the instruction may be representative of a command to store the video summary in the video summary database 70.

The system 10 further includes a video crowdsourcing module 80 configured to crowdsource the video summary to at least one of the plurality of users. In one embodiment, the video summary may be crowdsourced to the plurality of users who may be registered within the platform or may be crowdsourced to multiple users who may be outside the platform and may be registered with the platform. Such crowdsourcing may be performed by an authorized entity. Here, the authorized entity may include at least one of an authorized user associated with the video summary, an authorized user associated with content of the video summary, a user who may be a representative of any authorized user, an authorized body such an organization, an institution, or the like, or a combination thereof.

In one exemplary embodiment, the system 10 may further include a display module which may be configured to display the video summary on the platform, and provide an authorization access for the plurality of user to view the same from the user device.

Furthermore, the system 10 includes a video review module 90 configured to enable the at least one of the plurality of users to review the video summary and identify at least one new characteristic associated with the video summary. In one embodiment, the at least one new characteristic may include at least one of an expression, a movement, a content, a description, a text, a multimedia clipping, or a combination thereof, which the user may think needs to be added in the video summary.

Subsequently, the system 10 includes a characteristic input module 100 which is configured to enable the at least one of the plurality of users to share the at least one new characteristic on the platform. More specifically, as the user may decide the need to add the corresponding at least one new characteristic in the video summary, the user may share the same on the platform via the user device.

The system 10 also includes a video comparison module 110 configured to compare at least one existing characteristic of the building block model with the corresponding at least one new characteristic shared by the at least one of the plurality of users. In one embodiment, comparison of the at least one new characteristic with the corresponding at least one existing characteristic may be achieved using one of the image processing technique, the machine learning technique, the artificial intelligence technique, or a combination thereof. Upon comparing the same, the video comparison module 110 may generate a comparison result.

In one exemplary embodiment, the system 10 may further include an incentive generation module which may be configured to generate an incentive for the at least one of the plurality of users for identifying and sharing the at least one new characteristic with the platform based a pre-defined set of rules. In one embodiment, the pre-defined set of rules may include a type of incentive to be generated based on the type of review generated by the user, relevancy of the review, response time taken to share the review, comparison result, or the like or the combination thereof. The pre-defined set of rules may be defined by the authorized entity. In one exemplary embodiment, the incentive may be one of case reward, credit point, a physical gift, a score, a gift voucher or the like, or a combination thereof.

Furthermore, the incentive generation module may also be configured to share a generated incentive with the at least one of the plurality of users who shared the at least one new characteristic. More specifically, on identifying the user who has provided the review for the video summary, the incentive generation module may transfer the generated credit in the name of that user.

Furthermore, the system 10 includes a video reconciliation module 120 configured to reconcile the video summary along with at least one inserted new characteristic with the building block model to enable the building block model to learn, using the machine learning technique. More specifically, on receiving the at least one new characteristic, the video reconciliation module 120 analyses the relevancy of the same and may analyse an extension up to which the building block model needs to me enhanced. The extension for enhancing the building block model may also be determined based on the comparison result. In one exemplary embodiment, if the comparison result is within a threshold level, the video reconciliation module 120 may just update the building block model. The threshold level may be determined by the building block training module based on number of missing characteristics between the at least one existing characteristic and the corresponding at least one new characteristic.

The video reconciliation module 120 is also configured to create a new building block model as and when the building block model learns about the at least one new characteristic. In one embodiment, the video reconciliation module 120 may decide to create the new building block model when the comparison result is outside the threshold value. The video reconciliation module 120 may identify a common pattern between the at least one existing characteristic and the corresponding at least one new characteristic and further on applying the machine learning technique may decide to generate the new building block model to enhance functionality of the building block model. In one embodiment, the common pattern may be identified from missing characteristics upon comparing the video summary and the review provided by the one or more users. In one specific embodiment, the system 10 may further include a video verification module which may be configured to verify the at least one new characteristic missing in the building block model prior to creating the new building block model. In such embodiment, the comparison may be achieved using one of the image processing technique, the machine learning technique, the artificial intelligence technique, or a combination thereof.

The system 10 further includes a video editing module 130 configured to edit the video summary by inserting the at least one new characteristic into the video summary to create the enhanced video summary. On analysing the new characteristics and using one of the updated building block model or the new building block model, the video editing module 130 recreates the video summary by adding the at least one new characteristic at the specified interval of time and created the enhanced video summary.

In one exemplary embodiment, the system 10 may further include a video sharing module which may be configured to share one of the video summary, the enhanced video summary, or a combination thereof on the platform to enable the plurality of user to view. In such embodiment, the video sharing module may initially generate a query to one of the plurality of users which may be representative of a permission or a requirement for the video summary to be shared on the platform. In such another embodiment, the video sharing module may also generate the query which may be representative of the permission or the requirement for the video summary to be shared outside the platform.

The video sharing module may also be configured to store the video summary, the enhanced video summary, or a combination thereof in the video library database 70. The video sharing module may share the video summary or the enhanced video summary with the video storage module 60 which may thereby store the same in the video library database 70.

In one specific embodiment, the system 10 may further include an action input module which may be configured to receive at least one action to be performed on one of the video summary, the enhanced video summary, or a combination thereof, from one of the plurality of users. The action input module may also be configured to receive an accuracy input which may be associated to one of the video summary, the enhanced video summary, or a combination thereof. On receiving the same, the video editing module 130 may further edit or refine the video summary or the enhanced video summary.

Furthermore, the next time the video summary module 50 creates the video summary similar to the characteristics learnt, the new building block model will be able to identify the at least one new characteristic which was not identified at an initial point, since the new building block has learnt about the missed characteristic.

Figure 2:
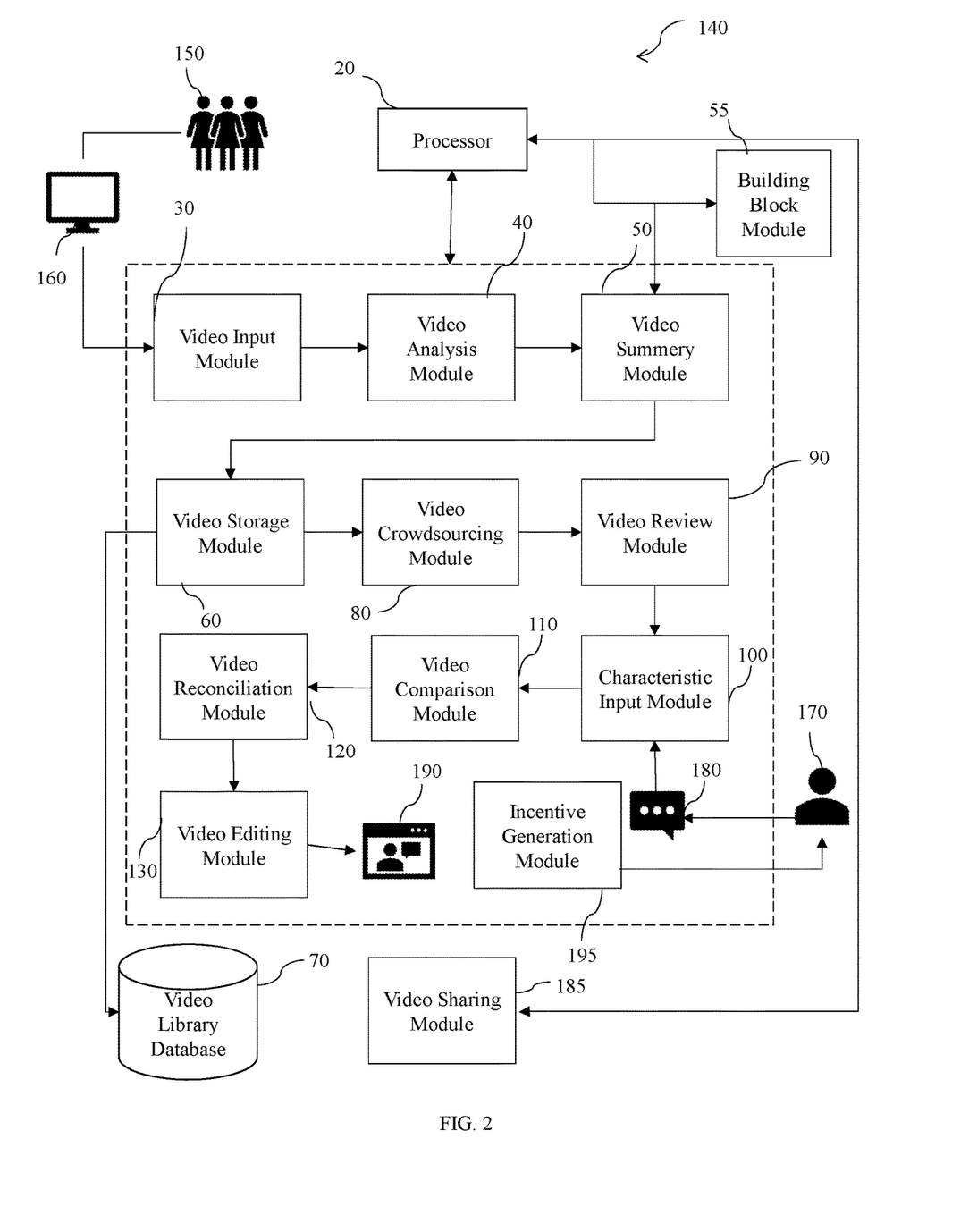
FIG. 2 is a block diagram representation of an exemplary embodiment of the system to crowdsource a video summary to create an enhanced video summary for a social event of FIG. 1 in accordance with an embodiment of the present disclosure.

FIG. 2 is a block diagram representation of an exemplary embodiment of the system 140 to crowdsource a video summary to create an enhanced video summary for a social event of FIG. 1 in accordance with an embodiment of the present disclosure. Multiple users 150 who have attended the social event and wish to retrieve the video summary of the social event (which we assume to be held on a day 'X' dated 'Y') would register onto the platform upon provide multiple user details via a user device 160 through a registration module. Further, multiple videos are uploaded to the platform via a video input module 30 through the multiple user 150 who attended the social event and have registered on the platform.

Further, once the system 140 receives the multiple videos, they are analysed for the relevancy among each other to verify whether the content of the videos s belong to the social event which was held on the day X; analysis of the multiple videos is done by a video analysis module 50. On identifying a relevancy, a building block model gets generated by a building block module 55. With the generated building block, a video summary gets created by a video summary module 50, and the created video summary is stored in a video library database 70 by a storage module 60. The created video summary is further crowdsourced to a social worker 170 by a video crowdsourcing module. On receiving the video summary, the social worker 170 views the video summary associated to the social event and decides to give a review for the same via a video review module, as the social worker feels that an important message, hereafter represented as message 'A', associated to the social event is very important to be included in the video summary, as the message 'A' may leave a huge impact on society who views the created video summary. Consequently, the social worker 170 shares the message 'A' 180 along with a suggestion of adding the same at a duration of 'Z' seconds in the video summary, via a characteristic input module, wherein the message 'A' is considered as a type of characteristic feature.

Furthermore, the received message 'A' is compared with existing characteristic of the building block model by a video comparison module. Prior to comparison, a video verification module verifies an authenticity of the message 'A' using one of the ML technique and the AI technique. Subsequently, a video reconciliation module creates a new building block model upon enabling the building block model to learn and get trained using the ML technique upon receiving the message 'A'. Once the new building model is created, using the same, the video summary is edited to create an enhanced video summary 190, by a video editing module. Further, the enhanced video summary 190 is shared to one or more users by a video sharing module 185.

Moreover, the social worker 170 is rewarded with a pre-defined amount of digital cash as an incentive for recognising and giving the review of message 'A' to be added in the video summary to create the enhanced video summary 190 in order to create a social impact. The incentive is generated by an incentive generation module 195, and further the generated incentive is shared with the user via the platform.

It should be noted that, all the above-described modules of FIG. 2 are operable by one or more processors 20. Furthermore, the system 140, the one or more processors 20, the video input module 30, the video analysis module 40, the video summary module 50, the video storage module 60, the video library database 70, the video crowdsourcing module 80, the video review module 90, the characteristic input module 100, the video comparison module 110, the video reconciliation module 120, the video editing module 130 of FIG. 2 are substantially similar to a system 10, a one or more processors 20, a video input module 30, a video analysis module 40, a video summary module 50, a video storage module 60, a video library database 70, a video crowdsourcing module 80, a video review module 90, a characteristic input module 100, a video comparison module 110, a video reconciliation module 120, a video editing module 130 of FIG. 1, and all the embodiments described in FIG. 1 applies to corresponding modules of FIG. 2.

Figure 3:
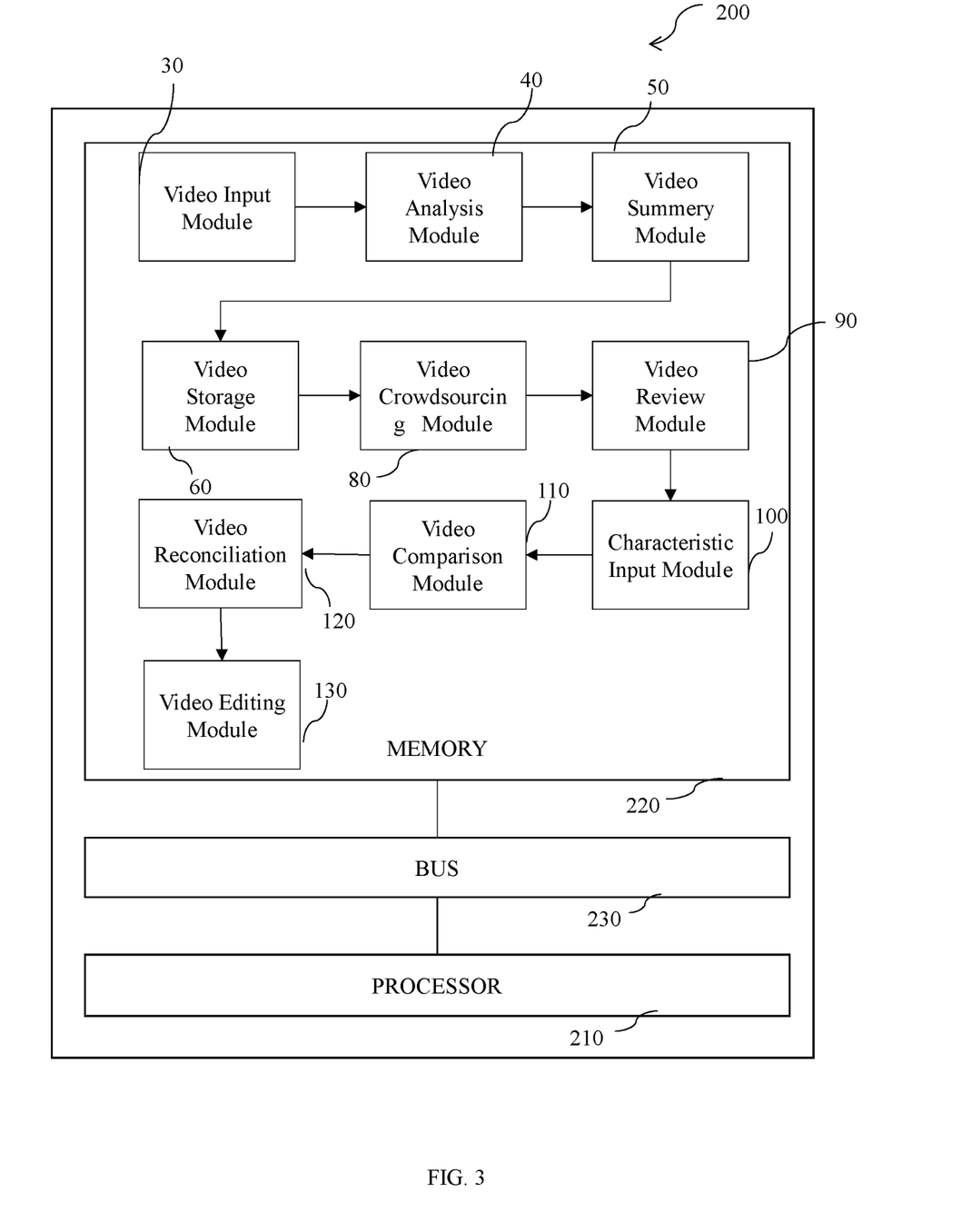
FIG. 3 is a block diagram representation of a processing subsystem located on a local server or on a remote server in accordance with an embodiment of the present disclosure.

FIG. 3 is a block diagram representation of a processing subsystem located on a local server or on a remote server in accordance with an embodiment of the present disclosure. The server 200 includes processor(s) 210, and memory 220 operatively coupled to the bus 230.

The processor(s) 210, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 4A:
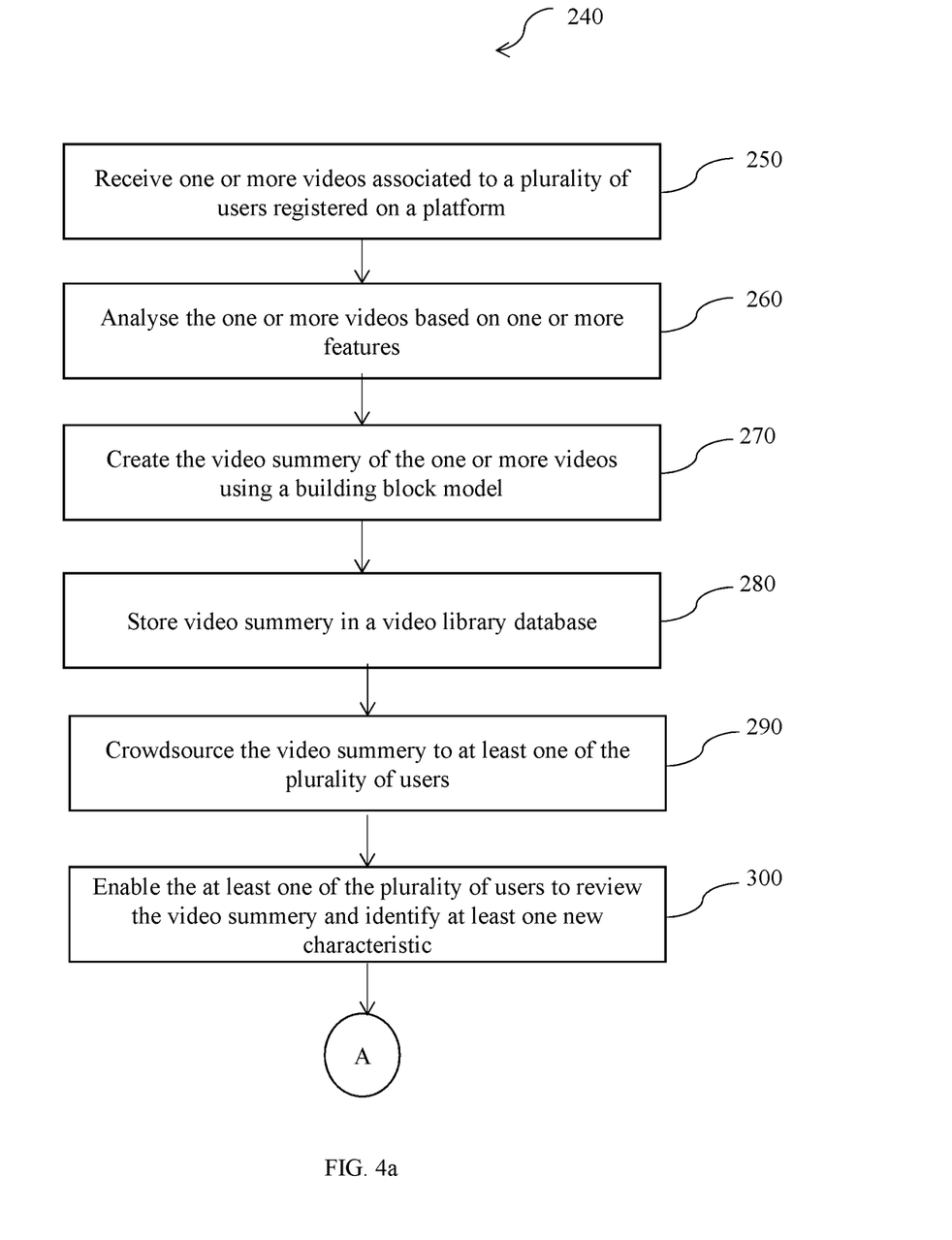
FIG. 4a and FIG. 4b are flow charts representing steps involved in a method for crowdsourcing a video summary for creating an enhanced video summary in accordance with an embodiment of the present disclosure.
Figure 4B:
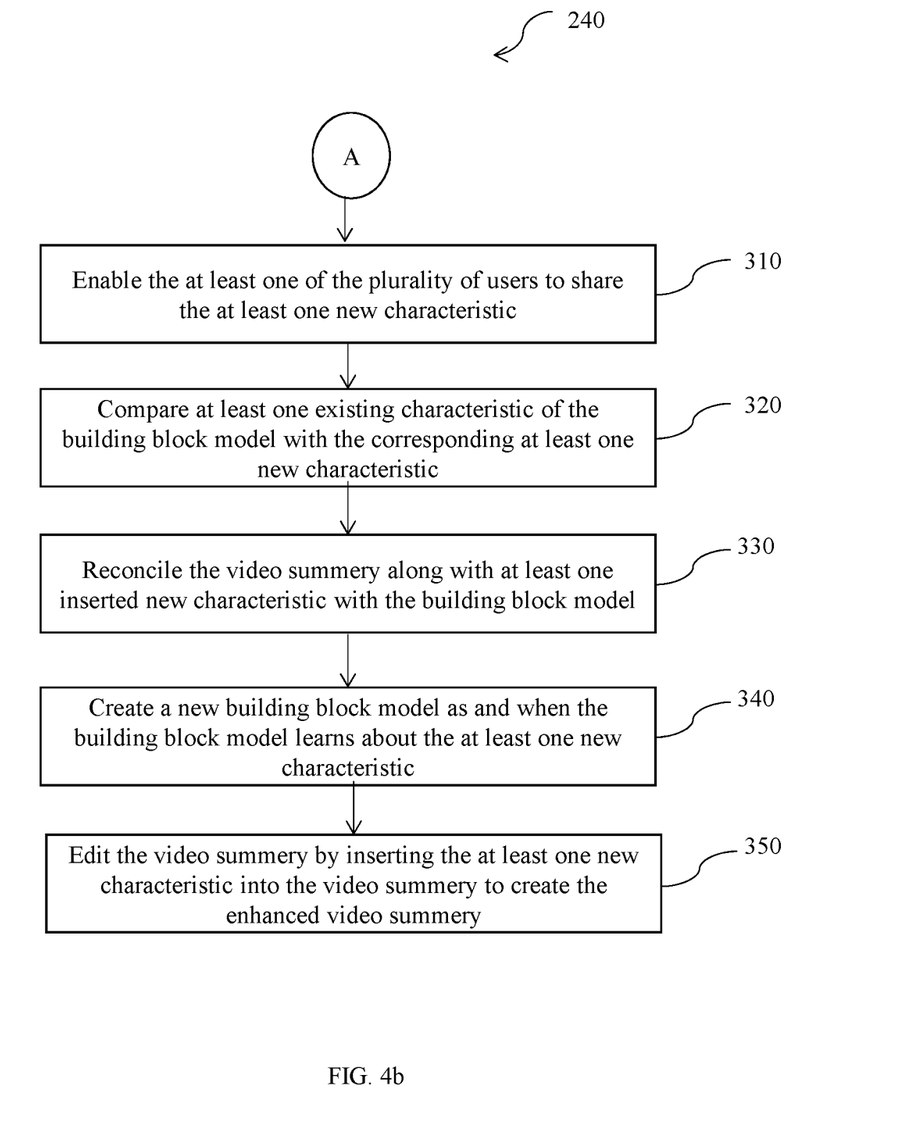

The memory 220 includes a plurality of modules stored in the form of executable program which instructs the processor 210 to perform the method steps illustrated in FIG. 4a and FIG. 4b. The memory 220 is substantially similar to the system 10 of FIG. 1. The memory 220 has the following modules: a video input module 30, a video analysis module 40, a video summary module 50, a video storage module 60, a video crowdsourcing module 80, a video review module 90, a characteristic input module 100, a video comparison module 110, a video reconciliation module 120, a video editing module 130.

The video input module 30 is configured to receive one or more videos associated to a plurality of users. The video analysis module 40 is configured to analyse the one or more videos based on one or more features. The video summary module 50 is configured to create the video summary of the one or more videos using a building block model. The video storage module 60 is configured to store the video summary in a video library database. The video crowdsourcing module 80 is configured to crowdsource the video summary to at least one of the plurality of users. The video review module 90 is configured to enable the at least one of the plurality of users to review the video summary and identify at least one new characteristic associated with the video summary. The characteristic input module 100 is configured to enable the at least one of the plurality of users to share the at least one new characteristic on the platform. The video comparison module 110 is configured to compare at least one existing characteristic of the building block model with the corresponding at least one new characteristic. The video reconciliation module 120 is configured to reconcile the video summary along with at least one inserted new characteristic with the building block model and to create a new building block model. The video editing module 130 is configured to edit the video summary by inserting the at least one new characteristic into the video summary to create the enhanced video summary.

FIG. 4a and FIG. 4b are flow charts representing steps involved in a method 240 for crowdsourcing a video summary for creating an enhanced video summary in accordance with an embodiment of the present disclosure. The method 240 includes receiving one or more videos associated to a plurality of users registered on a platform, from one or more sources in step 250. In one embodiment, receiving the one or more videos may include receiving the one or more videos by a video input module.

In one exemplary embodiment, the method 240 may further include registering a plurality of users on the platform, upon receiving multiple user details, wherein the multiple user details may include name, age, occupation, employer, contact details/s or the like.

In one embodiment, receiving the one or more videos may include receiving the one or more videos representative of an event which may be associated to the corresponding plurality of users. In one specific embodiment, receiving the one or more videos may include receiving the one or more videos at least one of an internal source, an external source or a combination thereof. Here, in one embodiment, the internal source may include a storage unit within the platform. In another embodiment, the internal storage may be a storage unit within a user device through which the corresponding plurality of users may be accessing the platform.

The method 240 also includes analysing the one or more videos based on one or more features using an image processing technique in step 260. In one embodiment, analysing the one or more videos may include analysing the one or more videos by a video analysis module. In analysing the one or more videos may include analysing the one or more videos based on at least one of time at which the one or more videos were captured, place in which the one or more videos were captured, event in which the one or more videos were captured, at least one of the plurality of users who have been captured in the one or more videos, content of the one or more videos, one or more similar moments from the corresponding one or more videos, or the like.

The method 240 also includes creating the video summary of the one or more videos using a building block model based on one or more analysed videos using one of an artificial intelligence technique or a machine learning technique, or a combination thereof in step 270. In one embodiment, creating the video summary may include creating the video summary by a video summary module.

Furthermore, the method 240 includes storing the video summary in a video library database in step 280. In one embodiment, storing the video summary may include storing the video summary by a video storage module. In one exemplary embodiment, storing the video summary may include storing the video summary upon receiving an instruction, wherein the instruction may be representative of a command to store the video summary in the video summary database.

The method 240 also includes crowdsourcing the video summary to at least one of the plurality of users in step 290. In one embodiment, crowdsourcing the video summary may include crowdsourcing the video summary by a video crowdsourcing module. In one exemplary embodiment, crowdsourcing the video summary may include crowdsourcing the video summary to the plurality of users who may be registered within the platform or may be crowdsourced to multiple users who may be outside the platform and may be registered with the platform, by an authorized entity.

The method 240 also includes enabling the at least one of the plurality of users to review the video summary and identifying at least one new characteristic associated with the video summary in step 300. In one embodiment, enabling the review may include enabling the review by a video review module. In one embodiment, enabling the review may include enabling the review and identifying at least one of an expression, a movement, a content, a description, a text, a multimedia clipping, or a combination thereof.

The method 240 also includes enabling the at least one of the plurality of users to share the at least one new characteristic on the platform in step 310. In one embodiment, enabling the share may include enabling the share by a characteristic input module.

In one exemplary embodiment, the method 240 may further include generating an incentive for the at least one of the plurality of users for identifying and sharing the at least one new characteristic with the platform based a pre-defined set of rules. In such embodiment, generating the incentive may include generating the incentive by an incentive generation module. The method 240 may further include sharing a generated incentive with the at least one of the plurality of users who shared the at least one new characteristic. In such embodiment, sharing the generated incentive may include sharing the generated incentive by the incentive generation module.

Furthermore, the method 240 includes comparing at least one existing characteristic of the building block model with the corresponding at least one new characteristic in step 320. In one embodiment, comparing at least one existing characteristic may include comparing at least one existing characteristic by a video comparison module. In one exemplary embodiment, comparing at least one existing characteristic may include comparing at least one existing characteristic using one of the image processing technique, the machine learning technique, the artificial intelligence technique, or a combination thereof.

The method 240 also includes reconciling the video summary along with at least one inserted new characteristic with the building block model for enabling the building block model for learning using the machine learning technique in step 330. In one embodiment, reconciling the video summary may include reconciling the video summary by a video reconciliation module. In one embodiment, the method 240 may include updating the building block model if the comparison result is within a threshold level.

The method 240 also includes creating a new building block model as and when the building block model learns about the at least one new characteristic in step 340. In one embodiment, creating the new building block model may include creating the new building block model by the video reconciliation module. In one exemplary embodiment, creating the new building block model may include creating the new building block model when the comparison result is outside the threshold value for enhancing functionality of the building block model.

In one exemplary embodiment, the method 240 may further include verifying the at least one new characteristic missing in the building block model prior to creating the new building block model. In such embodiment, verifying the at least one new characteristic may include verifying the at least one new characteristic by video verification module.

The method 240 also includes editing the video summary by inserting the at least one new characteristic into the video summary to create the enhanced video summary in step 350. In one embodiment, editing the video summary may include editing the video summary by a video editing module. In one exemplary embodiment, the method 240 may further include receiving at least one action to be performed on one of the video summary, the enhanced video summary, or a combination thereof, from one of the plurality of users. In such embodiment, receiving the at least one action may include receiving the at least one action by an action input module.

The method 240 may further include receiving an accuracy input which may be associated to one of the video summary, the enhanced video summary, or a combination thereof. In such embodiment, receiving the accuracy may include receiving the accuracy by the action input module. The method 240 may further include editing or refining, by the video editing module, the video summary or the enhanced video summary. In such embodiment, editing or refining may include editing or refining by the video editing module.

Various embodiments of the present disclosure enable the system to provide a platform to crowdsource the video summary which enable the system to receive feedback from experienced or professionals which adds on for the system to learn and enhance the creation of the video summary, thereby making the system more reliable and efficient. Also, since the system uses the machine learning technique and the artificial intelligence technique, the system is more reliable as it learns from every built video summary, thereby making the system understand and provide most accurate video summary for the users.

Further, the platform is highly secure, and do not allow any sharing of the video summary without the consent of the user or any authorized entity, thereby making the system more reliable; thereby making the system satisfy the requirements and needs of the user, and also provides a good user experience.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for crowdsourcing a video summary to create an enhanced video summary, the system comprising:
   one or more processors;
   a video input module, operable by the one or more processors, configured to receive one or more videos associated with a plurality of users registered on a platform;
   a video analysis module, operable by the one or more processors, configured to analyze the one or more videos based on one or more features, the analysis based at least in part on an image processing technique;
   a video summary module, operable by the one or more processors, configured to create the video summary of the one or more videos using a building block model based on the one or more analyzed videos;
   a video storage module, operable by the one or more processors, configured to store the video summary in a video library database;
   a video crowdsourcing module, operable by the one or more processors, configured to crowdsource the video summary with at least one of the plurality of users;
   a video review module, operable by the one or more processors, configured to enable at least one of the plurality of users to review the video summary and identify at least one new characteristic associated with the video summary;
   a characteristic input module, operable by the one or more processors, configured to enable at least one of the plurality of users to share the at least one new characteristic on the platform;
   a video comparison module, operable by the one or more processors, configured to compare at least one existing characteristic of the building block model with the at least one new characteristic shared by at least one of the plurality of users to yield a comparison result, wherein a determination is made whether the comparison result is within or outside a threshold level;

a video reconciliation module, operable by the one or more processors, configured to:

reconcile the video summary along with at least one inserted new characteristic with the building block model to enable the building block model to learn using a machine learning technique, wherein the building block model is updated when the comparison result is within the threshold level; and create a new building block model based at least in part on the at least one new characteristic, wherein the new building block model is created when the comparison result is outside the threshold level; and a video editing module, operable by the one or more processors, configured to edit the video summary by inserting the at least one new characteristic into the video summary to create the enhanced video summary.

2. The system of claim 1, wherein the one or more features comprises a time at which the one or more videos were captured, a place in which the one or more videos were captured, an event in which the one or more videos were captured, at least one of the plurality of users captured in the one or more videos, content captured in the one or more videos or a combination thereof.

3. The system of claim 1, wherein the at least one new characteristic comprises an expression, a movement, a content, a description, a text, a multimedia clipping, or a combination thereof.

4. The system of claim 1, further comprising a video sharing module, operable by the one or more processors, configured to:

share one of the video summary, the enhanced video summary, or a combination thereof on the platform to enable the plurality of user to view; and store the video summary, the enhanced video summary, or a combination thereof in the video library database.

5. The system of claim 1, further comprising a video verification module, operable by the one or more processors, configured to verify the at least one new characteristic missing in the building block model prior to creating the new building block model.

6. The system of claim 1, further comprising an incentive generation module operable by the one or more processors, configured to:

generate an incentive for the at least one of the plurality of users for identifying and sharing the at least one new characteristic with the platform based on a pre-defined set of rules; and share a generated incentive with the at least one of the plurality of users who shared the at least one new characteristic.

7. The system of claim 1, further comprising an action input module, operable by the one or more processors, configured to:

receive at least one action to be performed on the video summary, the enhanced video summary, or a combination thereof, from one of the plurality of users; and receive an accuracy input associated with one of the video summary, the enhanced video summary, or a combination thereof, wherein the video editing module is further configured to edit or refine the video summary or the enhanced video summary.

8. A method of crowdsourcing a video summary to create an enhanced video summary, the method comprising:

receiving, by a video input module, one or more videos associated with a plurality of users registered on a platform;

analyzing, by a video analysis module, the one or more videos based on one or more features, based at least in part on an image processing technique;

creating, by a video summary module, the video summary of the one or more videos using a building block model based on one or more analyzed videos;

storing, by a video storage module, the video summary in a video library database;

crowdsourcing, by a video crowdsourcing module, the video summary with at least one of the plurality of users;

enabling, by a video review module, at least one of the plurality of users to review the video summary and identify at least one new characteristic associated with the video summary;

enabling, by a characteristic input module, at least one of the plurality of users to share the at least one new characteristic on the platform;

comparing, by a video comparison module, at least one existing characteristic of the building block model with the at least one new characteristic to yield a comparison result, wherein a determination is made whether the comparison result is within or outside a threshold level;

reconciling, by a video reconciliation module, the video summary along with at least one inserted new characteristic with the building block model for enabling the building block model to learn using a machine learning technique, wherein the building block model is updated when the comparison result is within the threshold level;

creating, by the video reconciliation module, a new building block model based at least in part on the at least one new characteristic, wherein the new building block model is created when the comparison result is outside the threshold level; and editing, by a video editing module, the video summary by inserting the at least one new characteristic into the video summary to create the enhanced video summary.

9. The method of claim 8, wherein the one or more features comprises a time at which the one or more videos were captured, a place in which the one or more videos were captured, an event in which the one or more videos were captured, at least one of the plurality of users captured in the one or more videos, content of the one or more videos, or a combination thereof.

10. The method of claim 8, wherein the at least one new characteristic comprises an expression, a movement, a content, a description, a text, a multimedia clipping, or a combination thereof.

11. The method of claim 8, further comprising:

sharing, by a video sharing module, the video summary, the enhanced video summary, or a combination thereof on the platform for enabling the plurality of user for viewing; and storing, by the video sharing module, the video summary, the enhanced video summary, or a combination thereof.

12. The method of claim 8, further comprising verifying, by a video verification module, the at least one new characteristic missing in the building block model prior to creating the new building block model.

13. The method of claim 8, further comprising:
generating, by an incentive generation module, an incentive for at least one of the plurality of users for identifying and sharing the at least one new characteristic with the platform based on a pre-defined set of rules; and
sharing, by the incentive generation module, the generated incentive with at least one of the plurality of users who shared the at least one new characteristic.

14. The method of claim 8, further comprising:
receiving, by an action input module, at least one action to be performed on the video summary, the enhanced video summary, or a combination thereof, from one of the plurality of users; and
receiving, by the action input module, an accuracy input associated with one of the video summary, the enhanced video summary, or a combination thereof; and
editing, by the video editing module, the video summary or the enhanced video summary.

\* \* \* \* \*